(12) United States Patent
Hoshino (10) Patent No.: US 10,025,163 B2
(45) Date of Patent: Jul. 17, 2018

(54) FLASH UNIT AND EMITTED LIGHT AMOUNT CONTROL METHOD

(71) Applicant: Olympus Corporation, Hachioji-shi, Tokyo (JP)

(72) Inventor: Kanako Hoshino, Saitama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/591,507

(22) Filed: May 10, 2017

(65) Prior Publication Data

US 2017/0343887 A1     Nov. 30, 2017

(30) Foreign Application Priority Data

May 25, 2016   (JP) .................................. 2016-104201

(51) Int. Cl.
| | | |
|---|---|---|
| *G03B 15/05* | (2006.01) | |
| *H05B 37/02* | (2006.01) | |
| *H04N 5/235* | (2006.01) | |
| *H04N 5/225* | (2006.01) | |

(52) U.S. Cl.
CPC .......... *G03B 15/05* (2013.01); *H04N 5/2256* (2013.01); *H04N 5/2354* (2013.01); *H05B 37/0281* (2013.01); *G03B 2215/0517* (2013.01)

(58) Field of Classification Search
CPC ........ G03B 15/02; G03B 15/03; G03B 15/05; H04N 5/222; H04N 5/225; H04N 5/2256; H04N 5/2354
See application file for complete search history.

(56) References Cited

U.S. PATENT DOCUMENTS

| | | | | |
|---|---|---|---|---|
| 8,233,080 B2 * | 7/2012 | Yanai | ...................... | G03B 15/05 348/240.99 |
| 2008/0193119 A1 * | 8/2008 | Miyazaki | ................. | G03B 7/16 396/157 |
| 2010/0080546 A1 * | 4/2010 | Lin | .......................... | G02B 7/36 396/65 |
| 2010/0165178 A1 * | 7/2010 | Chou | ...................... | G03B 13/32 348/371 |
| 2013/0278819 A1 * | 10/2013 | Liaw | ........................ | G03B 7/16 348/370 |

(Continued)

FOREIGN PATENT DOCUMENTS

JP        2005-275109        10/2005

*Primary Examiner* — Jason M Crawford
(74) *Attorney, Agent, or Firm* — John C. Pokotylo; Pokotylo Patent Services (57) ABSTRACT

A flash unit capable of being attached to a flash control unit, comprising: a memory that stores information relating to a light emission time for actual flash corresponding to a difference between an emitted light amount command value for actual flash and an emitted light amount command value for pre-flash, and a controller, including an light emission time calculation section that obtains light emission time corresponding to emitted light amount command value for actual flash based on emitted light amount command value for pre-flash, emitted light amount command value for actual flash, and information stored in the memory, wherein the controller inputs the emitted light amount command value for pre-flash and the emitted light amount command value for actual flash acquired to the light emission time calculation section, and controls actual flash of the flash light emitting source based on the light emission time.

11 Claims, 6 Drawing Sheets

(56) References Cited

U.S. PATENT DOCUMENTS

| | | | |
|---|---|---|---|
| 2014/0368729 A1* | 12/2014 | Takai | H04N 5/2354 |
| | | | 348/371 |
| 2014/0375837 A1* | 12/2014 | Ichihara | H04N 5/2354 |
| | | | 348/222.1 |
| 2015/0092084 A1* | 4/2015 | Lee | H04N 5/2256 |
| | | | 348/234 |
| 2016/0327261 A1* | 11/2016 | Kojima | H04N 5/2354 |
| 2017/0171447 A1* | 6/2017 | Yasuda | H04N 5/2256 |

* cited by examiner

| | | P1 | P2 | P3 | P4 | Q | P11 | P12 | P13 | P14 | |
|---|---|---|---|---|---|---|---|---|---|---|---|
| EMITTED LIGHT AMOUNT MAX | | | | | | | GV10 | | | | |
| EMITTED LIGHT AMOUNT MIN | | | | | | | GV0 | | | | |
| A | PRE-FLASH 1 EMITTED LIGHT AMOUNT | 10 μs | 10 μs | 10 μs | 10 μs | ..... | 50 μs | 50 μs | 50 μs | 50 μs | ..... |
| | DIFFERENCE ΔGV BETWEEN PRE-FLASH 1 & PRE-FLASH 2 GV VALUES | NONE | 0 | 1 | 2 | ..... | NONE | 0 | -1 | -2 | ..... |
| B | PRE-FLASH 2 EMITTED LIGHT AMOUNT | NONE | 10 μs | 20 μs | 30 μs | ..... | NONE | 60 μs | 50 μs | 40 μs | ..... |
| C | PRE-FLASH CONSTITUTING REFERENCE FOR ACTUAL FLASH | PRE-FLASH 1 | PRE-FLASH 1 | PRE-FLASH 1 | PRE-FLASH 1 | ..... | PRE-FLASH 1 | PRE-FLASH 1 | PRE-FLASH 1 | PRE-FLASH 1 | ..... |
| Ca | ACTUAL FLASH REFERENCE EMITTED LIGHT AMOUNT | ΔGV0 | ΔGV0 | ΔGV0 | ΔGV0 | ..... | ΔGV0 | ΔGV0 | ΔGV0 | ΔGV0 | ..... |
| | ..... | ..... | ..... | ..... | ..... | ..... | ..... | ..... | ..... | ..... | ..... |
| D | ACTUAL FLASH AMOUNT DIFFERENCE ΔGV | -5 | 5 μs | 5 μs | 5 μs | 5 μs | ..... | 10 μs | 40 μs | 30 μs | 20 μs | ..... |
| | | -4 | 5 μs | 5 μs | 5 μs | 5 μs | ..... | 20 μs | 50 μs | 40 μs | 30 μs | ..... |
| | | -3 | 5 μs | 5 μs | 10 μs | 15 μs | ..... | 30 μs | 60 μs | 50 μs | 40 μs | ..... |
| | | -2 | 10 μs | 15 μs | 20 μs | 25 μs | ..... | 40 μs | 70 μs | 60 μs | 50 μs | ..... |
| | | -1 | 20 μs | 25 μs | 30 μs | 35 μs | ..... | 50 μs | 80 μs | 70 μs | 60 μs | ..... |
| | | 0 | 30 μs | 35 μs | 40 μs | 45 μs | ..... | 60 μs | 90 μs | 80 μs | 70 μs | ..... |
| | | 1 | 40 μs | 45 μs | 50 μs | 55 μs | ..... | 70 μs | 100 μs | 90 μs | 80 μs | ..... |
| | | 2 | 50 μs | 55 μs | 60 μs | 65 μs | ..... | 80 μs | 110 μs | 100 μs | 90 μs | ..... |
| | | 3 | 60 μs | 65 μs | 70 μs | 75 μs | ..... | 90 μs | 120 μs | 110 μs | 100 μs | ..... |
| | | 4 | 70 μs | 75 μs | 80 μs | 85 μs | ..... | 100 μs | 130 μs | 120 μs | 110 μs | ..... |
| | | 5 | 80 μs | 85 μs | 90 μs | 95 μs | ..... | 110 μs | 140 μs | 130 μs | 120 μs | ..... |
| | | ..... | ..... | ..... | ..... | ..... | ..... | ..... | ..... | ..... | ..... | ..... |

FLASH UNIT AND EMITTED LIGHT AMOUNT CONTROL METHOD

Benefit is claimed, under 35 U.S.C. § 119, to the filing date of prior Japanese Patent Application No. 2016-104201 filed on May 25, 2016. This application is expressly incorporated herein by reference. The scope of the present invention is not limited to any requirements of the specific embodiments described in the application.

BACKGROUND OF THE INVENTION

1. Field of the Invention

The present invention relates to a flash unit that is capable of being attached to a camera or the like having a flash control unit, and an emitted light amount control method, for performing light emission in accordance with a control signal from the flash control unit.

2. Description of the Related Art

A flash unit that has been built into an imaging device such as a camera has a light emission table of least one or more relative GV values that are most appropriate for camera control, and carries out control of emitted light amount in accordance with this light emission table. On the other hand, when an external flash unit is connected to a camera and emitted light amount of the external flash unit is controlled (dimmer control), an optimal number of pre-flashes and the emitted light amount are made variable in accordance with performance of an image sensor, subject brightness and shooting distance, and optimum actual flash amount is determined in accordance with an amount of light that has been received by the camera at the time of pre-flash. With this light control, an external flash unit receives emitted light amounts for at the time of pre-flash and at the time of actual flash from the camera as GV values, and light emission control for the time of pre-flash and at the time of actual flash are controlled by referencing a flash table of absolute GV values that has been stored in memory within the external flash unit.

A pre-flash amount is different for every camera, and after pre-flash actual flash is carried out in a state where charged voltage of a main capacitor has been lowered. In a case where flash control is carried out using a flash table of absolute GV values, an absolute GV value table is stored for every charged voltage of the main capacitor. There is a detection circuit for charged voltage of a main capacitor, for this purpose (refer, for example, to Japanese patent laid-open No. 2005-275109 (hereafter referred to as "patent publication 1").).

SUMMARY OF THE INVENTION

An external flash unit of a first aspect of the present invention comprises a flash light emitting source, a communication circuit that carries out communication with a flash control unit, a memory that stores information relating to a light emission time for actual flash corresponding to a difference between an emitted light amount command value for actual flash of the flash light emitting source and an emitted light amount command value for pre-flash, and a controller, including a light emission time calculation section that obtains light emission time corresponding to emitted light amount command value for actual flash based on emitted light amount command value for pre-flash that has been input, emitted light amount command value for actual flash that has been input, and information stored in the memory, wherein the controller inputs the emitted light amount command value for pre-flash acquired via the communication circuit to the light emission time calculation section, inputs the emitted light amount command value for actual flash acquired via the communication circuit to the light emission time calculation section, and controls actual flash of the flash light emitting source based on the light emission time obtained by the light emission time calculation section.

A light emission control method of a second aspect of the present invention is a light emission control method for a flash unit capable of being attached to a flash control unit that has a flash light emitting source, a memory that stores information relating to a light emission time for actual flash corresponding to a difference between an emitted light amount command value for actual flash of the flash light emitting source and an emitted light amount command value for pre-flash, and comprising carrying out communication with the flash control unit, calculating a light emission time corresponding to emitted light amount command value for actual flash based on a difference between emitted light amount command value for pre-flash that has been input and emitted light amount command value for actual flash that has been input, and information stored in the memory, and controlling actual flash of the flashlight emitting source based on the light emission time for actual flash that has been calculated.

DETAILED DESCRIPTION OF THE PREFERRED EMBODIMENTS

In cooperation with the attached drawings, the technical contents and detailed description of the present invention are described thereinafter according to a preferable embodiment, being not used to limit its executing scope. Any equivalent variations and modifications made according to appended claims are all covered by the claims claimed by the present invention.

In the following, as one embodiment of the present invention, description will be given of an example applied to a camera system comprised of a digital camera (hereafter referred to as a "camera") and an external flash unit. This camera has an image sensor, with a subject image being converted to image data by this imaging section, and the subject image being subjected to live view display on a display section arranged on the rear surface of the camera body based on this converted image data. A photographer determines composition and photo opportunity by looking at a live view display. At the time of a release operation image data is stored in a storage medium. Image data that has been stored in the storage medium can be subjected to playback display on the display section if playback mode is selected.

Also, the camera is capable of connection to an external flash unit. The external flash unit stores information on minimum emitted light amount MIN and maximum emitted light amount MAX, and a relative GV value table (refer to FIG. 7 which will be described later). If absolute GV values (emitted light amount information) are transmitted from the camera, the external flash unit determines emitted light amount using minimum emitted light amount MIN, maximum emitted light amount MAX and the relative GV value table, and carries out control of emitted light amount. It should be noted that GV means guide number, and represents emitted light amount of the flash.

Figure 1:
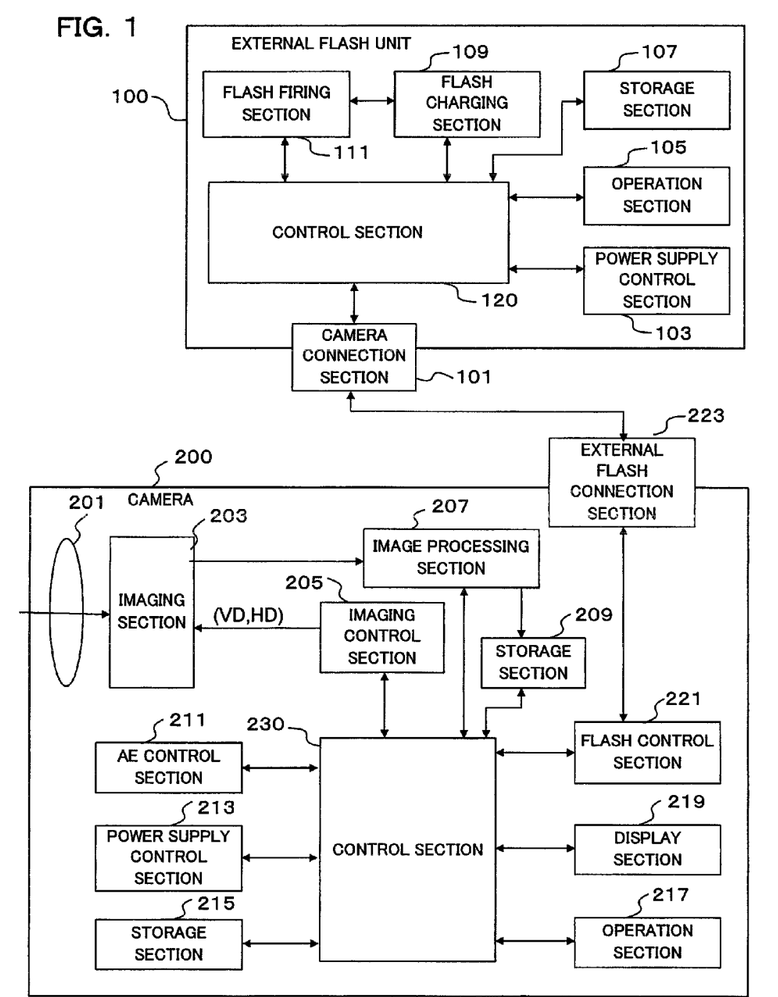
FIG. 1 is a block diagram mainly showing the electrical structure of a camera system made up of a camera and an external flash unit, of one embodiment of the present invention.

FIG. 1 is a block diagram mainly showing the electrical structure of a camera system that comprises an external flash unit 100 and a camera 200 of one embodiment of the present invention. It should be noted that with the example shown in FIG. 1 only a single external flash 100 is connected to a hot shoe of the camera 200, but this is not limiting and it is also possible to have a plurality of external flash units in either a wired or wireless fashion.

A lens 201 within the camera 200 has an optical lens, and forms a subject image. An imaging section 203 is arranged on the optical axis of the lens 201, and has an image sensor such as a CMOS image sensor or a CCD image sensor. The imaging section 203 is subjected to imaging control using an imaging control section 205, subjects a subject image to photoelectric conversion, and outputs an image signal to an image processing section 207.

The imaging control section 205 has an imaging control circuit, and performs photoelectric conversion control for the image sensor of the imaging section 203 and readout control of an image signal based on control signals from a control section 230. The control signals from the imaging control section 205 include a vertical synchronization signal VD and a horizontal synchronization signal HD, and light emission of the external flash unit 100 is carried out in synchronization with the vertical synchronization signal VD and a horizontal synchronization signal HD The image processing section 207 has an image processing circuit, and generates image data based on an image signal that has been read out from the imaging section 203, and applies various image processing such as exposure correction, noise processing, WB gain correction, edge enhancement, false color correction etc. to this image data that has been generated or image data that has been stored in a memory 215. Further, the image processing section 207 also carries out processing (development processing, expansion and compression processing) to convert image data that has been subjected to image processing to a stored data format etc.

A storage section 209 includes a storage medium that can be loaded into the camera 200, and stores image data that has been subjected to processing for storage by the image processing section 207. An AE control section 211 includes an exposure control circuit, and carries out control of the shutter, aperture etc. based on exposure control values (shutter speed, aperture value, ISO sensitivity etc.) for acquiring appropriate exposure. Subject brightness is obtained by the control section 230 from the image data, and the exposure control values are calculated based on this subject brightness.

A power supply control section 213 includes a power supply control circuit, and supplies power to each section within the camera 200 by making a voltage from a power supply battery within the camera 200 a constant voltage. The memory 215 has a non-volatile electrically rewritable memory such a flash memory, and/or a volatile memory, and stores adjustment values for the camera 200, programs to be executed by the CPU etc.

An operation section 217 has various operation members such as a power switch, release button, cross-shaped button, OK button, mode dial etc. There are a 1st release switch and a 2nd release switch that are sequentially turned on in response to operation of the release button. The operation section 217 detects operation states of these operation members and outputs results of detection to the control section 230. The operation section 217 is also provided with a touch panel that is capable of detecting touch operations by the photographer on a display section 219.

The display section 219 has a monitor (display) such as a liquid crystal display (LCD) or organic EL. The display section 219 carries out display such as live view display based on an image signal from the imaging section 203, playback display of an image that has been stored in the storage section 209, and display of menu screens for camera settings, etc.

A flash control section 221 includes a flash control circuit, and based on control signals from the control section 230 outputs emitted light amount for pre-flash and for actual flash to the external flash unit 100 as absolute GV values, at the time of pre-flash and actual flash. The flash control section 221 also receives various information from the external flash unit 100, such as maximum emitted light amount MAX and minimum emitted light amount MIN.

An external flash connection section 223 is provided on an external part of the camera 200, and is capable of connecting, via electrical contacts, with a camera connection section 101 of the external flash unit 100. For example, an attachment member of the external flash 100, such as a hot shoe, may also double as the connection section.

The control section (controller) 230 has a CPU (Central Processing Unit) and peripheral circuits for the CPU. The CPU implements overall control of the camera by controlling each of the sections within the camera 200 in accordance with programs stored in the memory 215.

A camera connection section 101 of the external flash unit 100 has a communication circuit, and by connecting to an external flash connection section 223 of the camera 200 the external flash unit 100 and the camera 200 are electrically connected and communication with the camera 200 is carried out. The camera connection section 101 functions as a communication circuit that carries out communication with the flash control unit.

A power supply control section 103 has a power supply control circuit, and makes a voltage from a power supply voltage within the external flash unit 100 into a constant voltage and supplies power to each section within the external flash unit 100. An operation section 105 has various operation members such as a power switch, test button and mode setting buttons etc., and detects operating states of these operation member and supplies detection results to a control section 120.

A storage section 107 has a non-volatile electrically rewritable memory such a flash memory, and/or a volatile memory, and stores adjustment values for the external flash unit 100, programs to be executed by the CPU etc. The storage section 107 also stores a relative GV value table (refer to FIG. 7) that holds emitted light amounts at the time of a first pre-flash, time of a second pre-flash firing, time of actual flash, etc.

The storage section 107 functions as a memory that stores information relating to a light emission time for actual flash corresponding to a difference between an emitted light amount command value for actual flash and an emitted light amount command value for pre-flash of the flash firing section. This memory also stores information relating to light emission time of actual flash corresponding to a difference between first emitted light amount command value for first pre-flash and emitted light amount command value for second pre-flash (refer, for example, to line A in FIG. 7). This memory also includes a plurality of information relating to light emission time corresponding to emitted light amount command value for actual flash, which corresponds to a difference between an emitted light amount command value for first pre-flash and an emitted light amount command value for second pre-flash (refer to line D in FIG. 7).

A flash charging section 109 has a flash charging circuit, and boosts a voltage of a power supply battery within the external flash unit 100 for flash emission, and carries charging of a main capacitor. A flash firing section 111 has a light emission source such as a xenon tube, and emits light with a boost voltage from the flash charging section 109 being applied. The light emission timing and emitted light amount at this time are carried out in accordance with control signals from the control section 120. It should be noted that a light emission source is not limited to a xenon tube and another firing source may be used.

The control section 120 has a CPU (Central Processing Unit) and peripheral circuits for the CPU. The CPU executes the overall control of the external flash unit 100 for flash firing etc. by controlling each section within the external flash unit 100 in accordance with programs stored in the storage section 107 and control signals from the camera 200.

Figure 2:
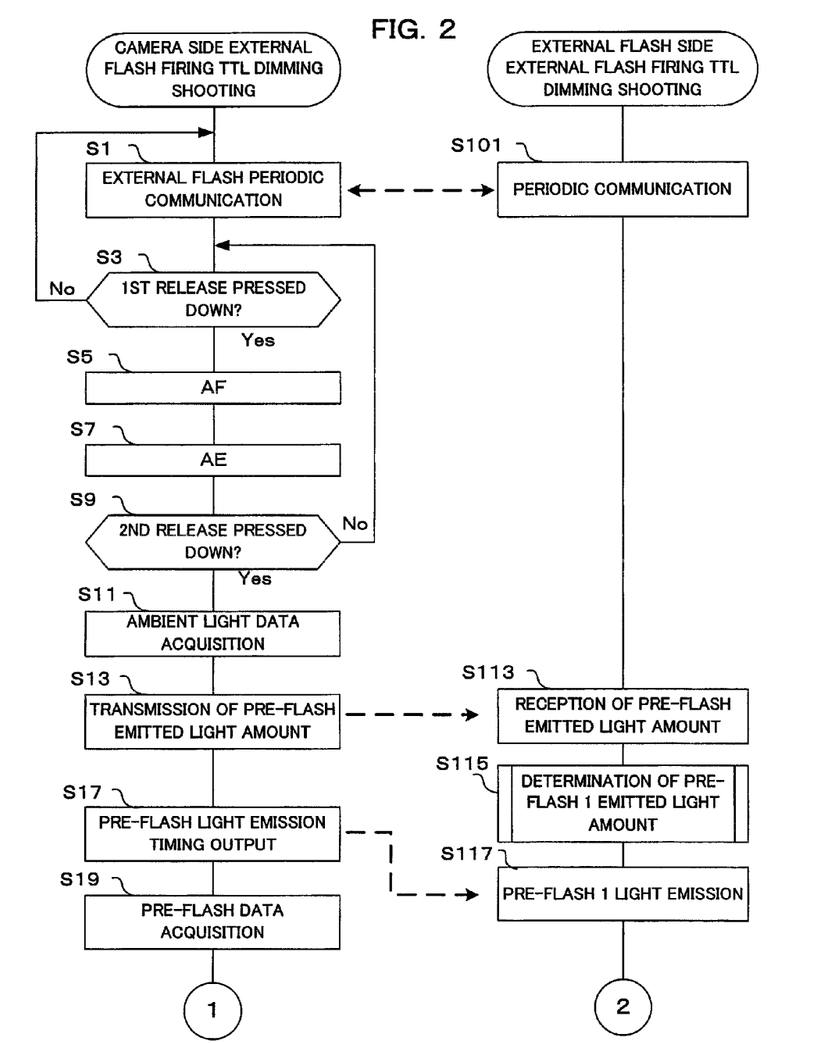
FIG. 2 is a flowchart showing an external flash firing TTL dimmer controlled shooting operation at the camera side and at the external flash unit side in one embodiment of the present invention.
Figure 3:
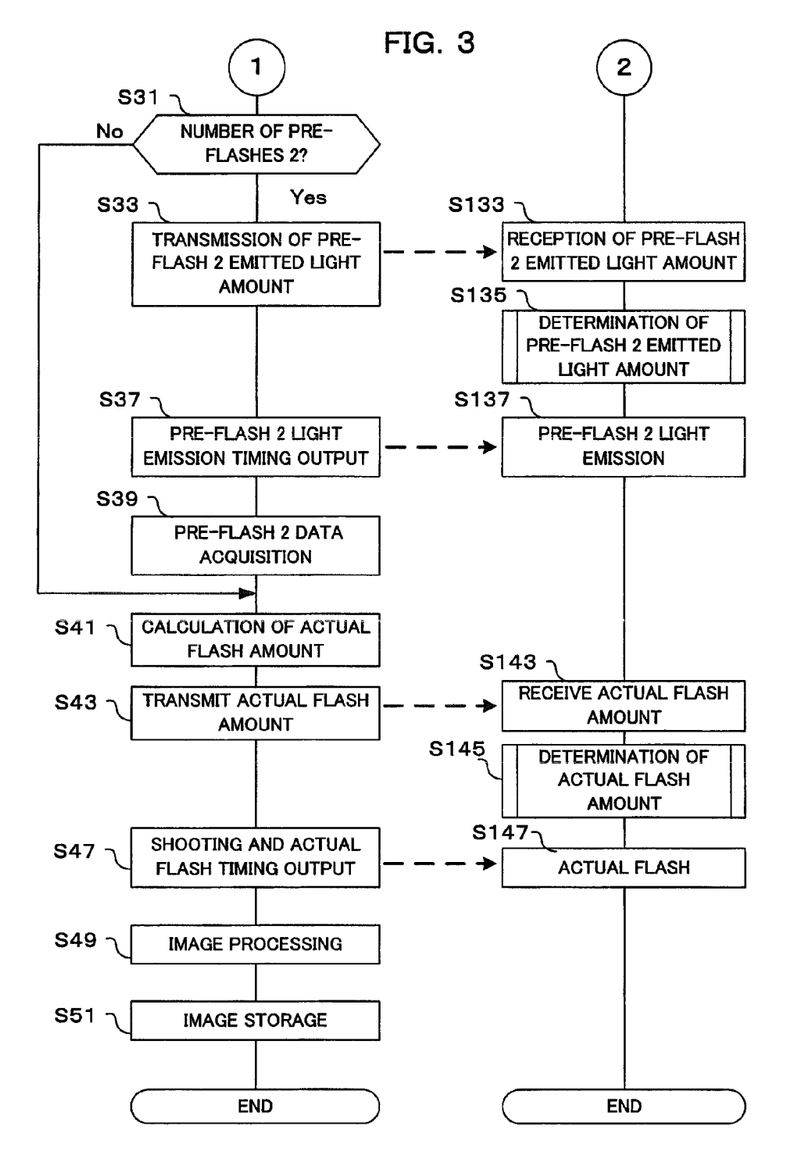
FIG. 3 is a flowchart showing external flash firing TTL dimmer controlled shooting at the camera side and at the external flash unit side in one embodiment of the present invention.
Figure 6:
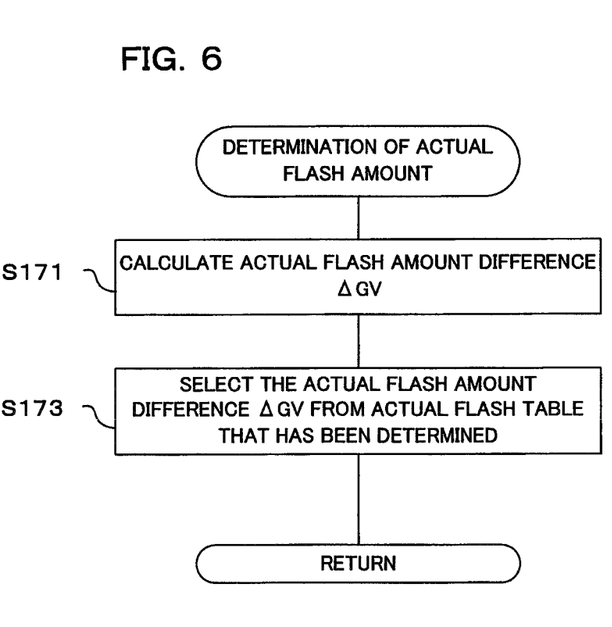
FIG. 6 is a flowchart showing emitted light amount determination for actual flash of the external flash unit of one embodiment of the present invention.

The control section 120 functions as a light emission time calculation section that obtained light emission time corresponding to emitted light amount command value for actual flash based on a emitted light amount command value for pre-flash that has been input, an emitted light amount command value for actual flash that has been input, and information stored in the storage section (refer, for example, to S145 in FIG. 3, and to FIG. 6). The control section 120 also functions as a controller that inputs an emitted light amount command value for pre-flash, that has been acquired by the communication section, to the light emission time calculation section, inputs an emitted light amount command value for actual flash, that has been acquired by the communication section, to the light emission time calculation section, and controls actual flash of the flash firing section based on light emission time that has been obtained by the light emission time calculation section (refer, for example, to S115 in FIG. 2, and S135, S145 and S147 in FIG. 3).

The controller is also capable of carrying out first pre-flash and second pre-flash of the flash control section before actual flash of the flash firing section (refer, for example, to S117 in FIG. 2 and S137 in FIG. 3). The control section 120 functions as a light emission time calculation section that obtains light emission time corresponding to emitted light amount command value for actual flash based on an emitted light amount command value for first pre-flash that has been input, an emitted light amount command value for second pre-flash that has been input, an emitted light amount command value for actual flash that has been input, and information stored in the storage section (refer, for example, to FIG. 6).

Figure 4:
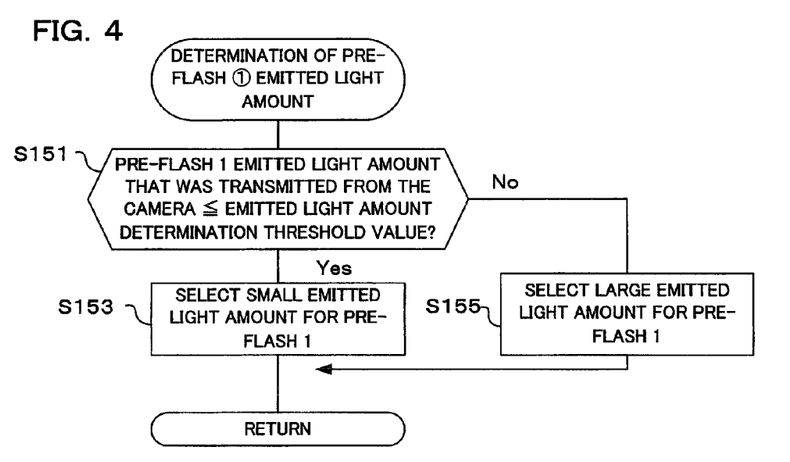
FIG. 4 is a flowchart showing emitted light amount determination for pre-flash 1 of the external flash unit of one embodiment of the present invention.
Figure 5:
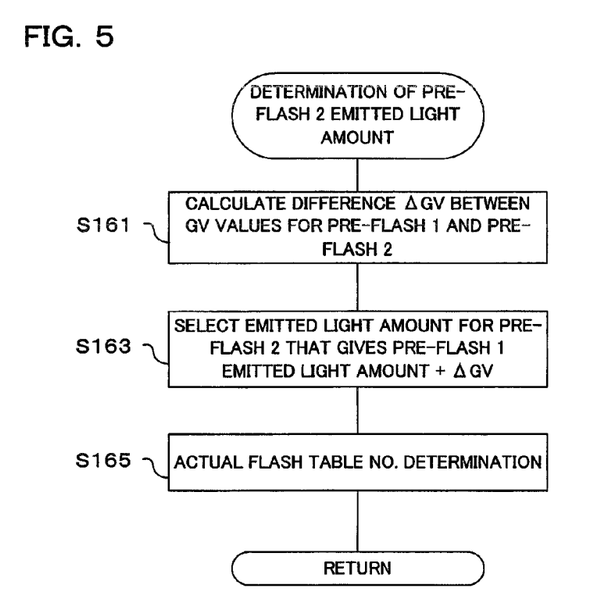
FIG. 5 is a flowchart showing emitted light amount determination for pre-flash 2 of the external flash unit of one embodiment of the present invention.

Next, a control operation for flash firing in a camera system of this embodiment will be described using the flowcharts shown in FIG. 2-FIG. 5. The left sides of the flowcharts shown in FIG. 2 and FIG. 3 show operations for external flash TTL (through the lens) dimmer controlled shooting at the camera 200 side, and these operations are executed by the CPU within the control section 230 of the camera 200 in accordance with programs stored in the memory 215. Also, the right sides of the flowcharts shown in FIG. 2 and FIG. 3, and the flowcharts shown in FIG. 4 and FIG. 5, show operations for external flash firing TTL dimmer controlled shooting at the external flash unit 100 side. It should be noted that TTL dimmer controlled shooting is a method of metering ambient light that has passed through a photographing lens and ambient light+flash reflected light, and controlling, based on the results of this metering, so that an emitted light amount of the flash unit gives an optimum exposure amount.

If the flow for external flash firing TTL dimmer controlled shooting is commenced, first external flash periodic communication is carried out (S1). Here, the flash control section 221 of the camera 200 carries out communication with the external flash unit 100 at predetermined time intervals.

If there is a request for periodic communication from the camera 200, the external flash unit 100 carries out periodic communication (S101). Here, communication from the camera 200 is responded to. At the time of this response the external flash unit 100 transmits information on the maximum emitted light amount MAX and the minimum emitted light amount MIN to the camera 200.

If external flash periodic communication has been carried out in step S1, the camera 200 next determines whether or not a 1st release has been pressed down (S3). Here, whether or not the release button has been pressed down half way is determined based on a detection signal from the operation section 217. If the result of this determination is that a 1st release has not been performed, processing returns to step S1.

If the result of determination in step S3 is that the 1st release has been pressed down, AF (autofocus: automatic focus adjustment) is carried out (S5). Here, the control section 230 generates a contrast evaluation value on the basis of image data from the imaging section 203 and image processing section 207, and moves the lens 101 to a position at which this contrast evaluation value becomes a peak.

Next, AE (auto exposure: automatic exposure control) is carried out (S7). Here, the control section 230 obtains subject brightness on the basis of image data from the imaging section 203 and image processing section 207, and calculates exposure control values, such as shutter speed and aperture value that achieve appropriate exposure.

Next, the camera 200 determines whether or not a 2nd release has been pressed down (S9). Here, whether or not the release button has been pressed down fully is determined based on a detection signal from the operation section 217. If the result of this determination is that a 2nd release has not been pressed down, processing returns to step S3.

If the result of determination in step S9 is that the 2nd release has been pressed down, ambient light data is acquired (S11). As information for carrying out control of light emitted by the external flash unit 100, first subject brightness information in a state where the external flash unit has not emitted any light, namely ambient light data, is acquired. In this step, in a state where the external flash unit 100 is not emitting light, the control section 230 acquires a subject brightness BV based on image data from the imaging section 203 and the image processing section 207.

Once the ambient light data has been acquired, next emitted light amount for pre-flash is transmitted (S13). Here, the camera 200 transmits emitted light amount at the time of carrying out pre-flash a first time to the external flash unit 100. If this transmission is carried out, the external flash unit 100 receives the emitted light amount for pre-flash (S113). The emitted light amount that has been transmitted from the camera 200 to the external flash unit 100 is an absolute GV value.

If the emitted light amount for pre-flash has been received in step S113, next an emitted light amount for a first pre-flash is determined (S115). An emitted light amount is transmitted from the camera 200 to the external flash unit 100 as an absolute GV value, but the external flash unit 100 only has a relative GV value table stored. In this step, therefore, the emitted light amount for at the time of the first pre-flash is determined. Detailed operation of this determination of emitted light amount will be described later using FIG. 4.

If the camera 200 has transmitted emitted light amount for the first pre-flash in step S13, a light emission timing for pre-flash is output (S17). With regard to the light emission timing for pre-flash, light is emitted in synchronism with a vertical synchronization signal VD and a horizontal synchronization signal HD.

If the external flash unit 100 has input the light emission timing for pre-flash, a first pre-flash is carried out (S117). The control section 120 makes the flash firing section 111 produce light emission at the light emission timing that has been input and at the emitted light amount that was determined in step S115.

If light emission timing for the first pre-flash is output in step S17, the camera 200 acquires data for pre-flash (S19). Here, at the time when the external flash unit 100 is carrying out the first pre-flash, the control section 230 acquires a subject brightness BV based on image data from the imaging section 203 and the image processing section 207.

If the camera 200 has acquired data for the first pre-flash in step S19, it is next determined whether or not a second pre-flash will be carried out (S31). Here determination is based on whether or not pre-flash data has been acquired to an extent that makes it possible to calculate actual flash amount. In a case where emitted light amount for the first pre-flash is too big or is too small in relation to subject distance etc., a second pre-flash is carried out.

If the result of determination in step S31 is that a second pre-flash will be carried out, emitted light amount for the second pre-flash is transmitted (S33). Here, the camera 200 transmits emitted light amount at the time of carrying out pre-flash a second time to the external flash unit 100. If the data that was acquired at the time of the first pre-flash was too small, the pre-flash amount is increased, while if the data was too large the pre-flash amount is reduced. If this transmission is carried out, the external flash unit 100 receives the emitted light amount for pre-flash (S133). The emitted light amount that has been transmitted from the camera 200 to the external flash unit 100 is an absolute GV value, the same as at the time of the first pre-flash.

If the emitted light amount for pre-flash has been received in step S133, next an emitted light amount for a second pre-flash is determined (S135). An emitted light amount is transmitted from the camera 200 to the external flash unit 100 as an absolute GV value, but as was mentioned earlier the external flash unit 100 only has a relative GV value table stored. In this step, therefore, the emitted light amount for at the time of the second pre-flash is determined. Detailed operation of this determination of emitted light amount will be described later using FIG. 5 and FIG. 7.

If the camera 200 has transmitted emitted light amount for the second pre-flash in step S33, a light emission timing for the second pre-flash is output (S37). With regard to the light emission timing for the second pre-flash, as with the emission timing for the first pre-flash, light is emitted at a time that is in synchronism with a vertical synchronization signal VD and a horizontal synchronization signal HD.

If the external flash unit 100 has input the light emission timing for pre-flash, a second pre-flash is carried out (S137). The control section 120 makes the flash firing section 111 produce light emission at the light emission timing that has been input and at the emitted light amount that was determined in step S135.

If the camera 200 has output light emission timing for the second pre-flash in step S37, data for the second pre-flash is acquired (S39). Here, similarly to at the time of the first pre-flash, at the time when the external flash unit 100 is carrying out the pre-flash, the control section 230 acquires a subject brightness BV based on image data from the imaging section 203 and the image processing section 207.

If data at the time of the second pre-flash has been acquired in step S39, or if the result of determination in step S31 was that a second pre-flash would not be carried out, the next actual flash amount is calculated (S41). Here, actual flash amount at the time of actual flash is calculated using ambient light data that was acquired in step S11, data at the time of a first pre-flash that was acquired in step S19, and also data of a second pre-flash, if such data was acquired in step S39. It should be noted that actual flash is a flash that is carried out by the external flash 100 at the time of forming image data that is acquired from the imaging section 203 for storage in the storage section 209.

If actual flash amount has been calculated in step S41, next the actual flash amount is transmitted (S43). Here, the camera 200 transmits emitted light amount at the time of carrying out actual flash to the external flash unit 100. If this transmission is carried out, the external flash unit 100 receives the emitted light amount for actual flash (S143). The emitted light amount that has been transmitted from the camera 200 to the external flash unit 100 is an absolute GV value in this case also.

If the emitted light amount for actual flash has been received in step S143, next an emitted light amount for actual flash is determined (S145). An emitted light amount is transmitted from the camera 200 to the external flash unit 100 as an absolute GV value, but as was mentioned earlier the external flash unit 100 only has a relative GV value table stored. In this step, therefore, the emitted light amount for at the time of actual flash is determined. This determination of emitted light amount will be described later using FIG. 6 and FIG. 7.

If the camera 200 has transmitted emitted light amount for actual flash in step S43, a light emission timing for actual flash is output (S47). With regard to the light emission timing for the actual flash also, as with the emission timing for pre-flash, light is emitted at a time that is in synchronism with a vertical synchronization signal VD and a horizontal synchronization signal HD.

If the external flash unit 100 has input the light emission timing for actual flash, actual flash is carried out (S147). The control section 120 makes the flash firing section 111 produce light emission at the light emission timing that has been input and at the emitted light amount that was determined in step S145. If this actual flash has been carried out, the operation for external flash side external flash firing TTL dimmer controlled shooting is terminated.

If the camera 200 has output a light emission timing for actual flash in step S47, next image processing is carried out (S49). In accordance with the time at which actual flash is carried out, the imaging section 203 commences exposure, and if an exposure time corresponding to the shutter speed that was obtained in step S7 has elapsed, exposure is completed. After completion of exposure, the imaging control section 205 reads out image data from the imaging section 203, and the image processing section 207 subjects the image data to image processing for storage.

Once image processing has been carried out in step S49, next image storage is carried out (S51). Here, image data that has been subjected to image processing for storage is stored in the storage section 209. Once the image storage has been carried out in step S51, operation for camera side external flash firing TTL dimmer controlled shooting is terminated.

Next, operation for determination of first pre-flash amount in step S115 will be described using the flowchart shown in FIG. 4.

If the flow for determination of emitted light amount for a first pre-flash is entered, it is first determined whether or not an emitted light amount for first pre-flash that has been transmitted from the camera is less than or equal to an emitted light amount determination threshold value (S151). As was described previously, the external flash unit 100 only has a relative GV value table as a table for determining emitted light amount. Therefore, an emitted light amount that has been transmitted from the camera 200 (expressed as absolute GV values) and an emitted light amount determination threshold value of the external flash unit 100 are compared, and it is determined whether or not this emitted light amount that has been transmitted is less than or equal to the emitted light amount determination threshold value. Specifically, if the absolute GV value is smaller than the emitted light amount determination threshold value, or if it is the same, in this step the determination is Yes.

If the result of determination in step S151 is Yes, a small emitted light amount is selected for the first pre-flash (S153). Here, the external flash unit 100 selects a small emitted light amount, for example, the minimum emitted light amount MIN for pre-flash. It should be noted that in this embodiment, the minimum emitted light amount MIN for pre-flash is selected, but emitted light amount is not limited to the minimum emitted light amount MIN for pre-flash and an emitted light amount that is larger than this (although an emitted light amount that is smaller than the emitted light amount in step S155 which will be described later) may also be selected. With the example of the relative value GV table of FIG. 7 which will be described later, a small emitted light amount for a first pre-flash (pre-flash 1) is set to an emitted light amount that corresponds to GV=0 (light emission time=10 µs), which is the minimum emitted light amount MIN for pre-flash.

If the result of determination in step S151 is No, a large emitted light amount is selected for the first pre-flash (S155). Here, the external flash unit 100 selects a large emitted light amount, for example, the maximum emitted light amount MAX for pre-flash. It should be noted that in this embodiment the maximum emitted light amount MAX for pre-flash is selected, but emitted light amount is not limited to the maximum emitted light amount MAX for pre-flash and an emitted light amount that is smaller than this (although an emitted light amount that is larger than the emitted light amount in step S153 that was described earlier) may also be selected. Alternatively, as a large emitted light amount the emitted light amount may be set to, for example, minimum emitted light amount MIN+1 (GV) or minimum emitted light amount MIN+2 (GV). With the example of the relative value GV table of FIG. 7, which will be described later, a large emitted light amount for a first pre-flash (pre-flash 1) is set to an emitted light amount that corresponds to GV=10 (light emission time=50 µs), which is the maximum emitted light amount MAX for pre-flash.

If emitted light amount has been selected in step S153 or step S155, the originating flow is returned to.

Next, operation for determination of second pre-flash amount in step S135 will be described using the flowchart shown in FIG. 5.

If the flow for emitted light amount determination for a second pre-flash is entered, first a difference ΔGV between GV values of a first pre-flash and a second pre-flash, that have been transmitted from the camera, is calculated (S161). Here, a difference between a first pre-flash amount (GV_1) that was received in step S113 and a second pre-flash amount (GV_2) that was received in step S135 is made ΔGV. Specifically, ΔGV=GV_2−GV_1 is calculated.

Figure 7:
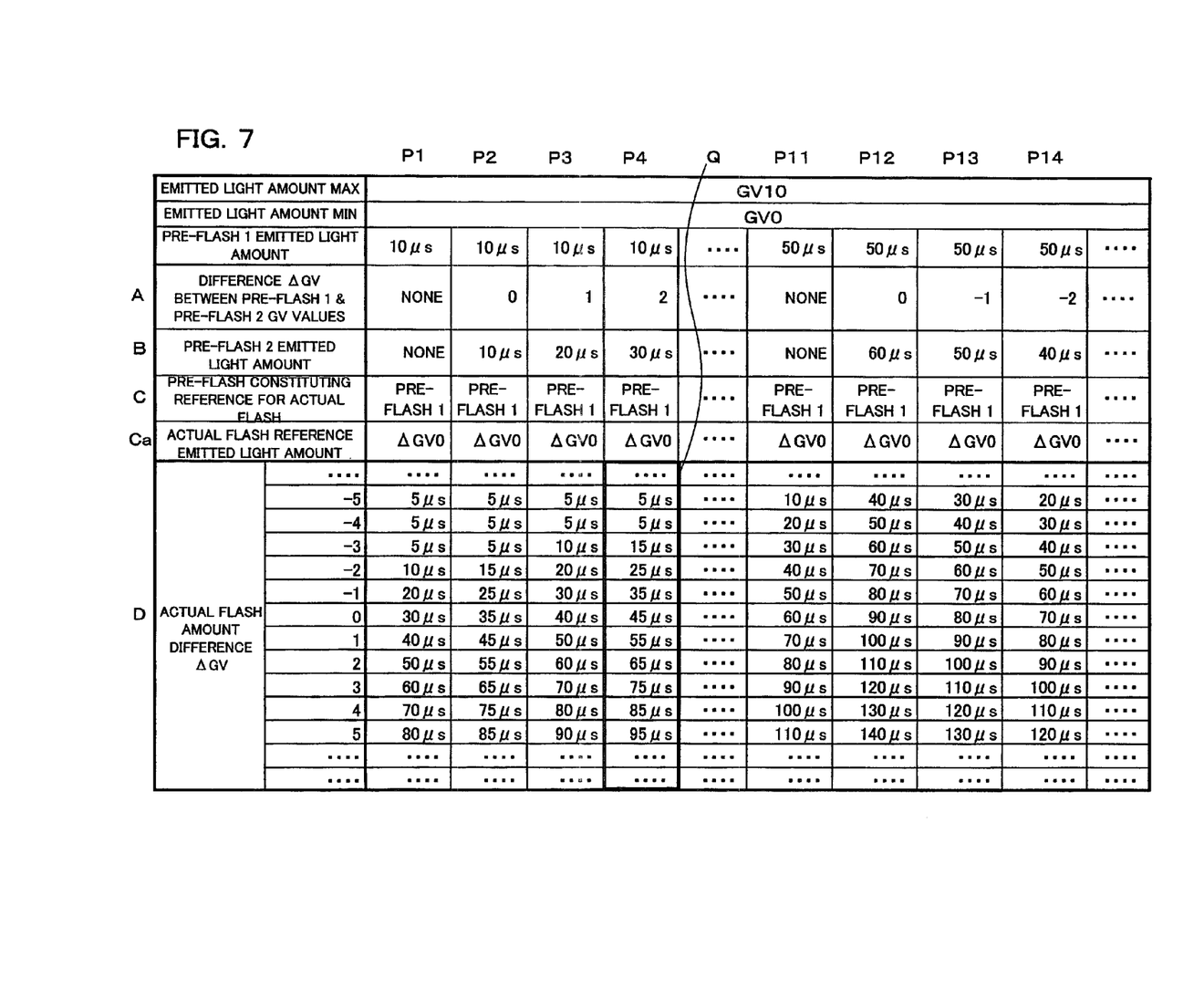
FIG. 7 is a relative GV value table in an external flash unit of one embodiment of the present invention.

Next, emitted light amount for a second pre-flash that is given by the first pre-flash amount+ΔGV is selected (S163). Here, the second pre-flash amount is selected using a relative GV value table such as shown in FIG. 7. With the example shown in FIG. 7, a difference ΔGV between GV values for the first pre-flash and the second pre-flash are shown on line A, and emitted light amounts for the second pre-flash, are shown on line B.

For example, in a case where, with the first pre-flash at MIN (GV=0, light emission time=10 µs), the second pre-flash is also MIN (GV=0), namely ΔGV=0, then the second pre-flash amount is equivalent to a light emission time of 10 µs, as entered in row P2. Also, in a case where the second pre-flash is GV=1, namely in a case where ΔGV=1, then the second pre-flash amount is equivalent to a light emission time of 20 µs, as entered in row P3. Also, in a case where, with the first pre-flash at MAX (GV=10, light emission time=0 µs), the second pre-flash is also MAX (GV=10), namely ΔGV=0, then the second pre-flash amount is equivalent to a light emission time of 60 µs, as entered in row P12. Further, in a case where the second pre-flash is GV=9, namely in a case where ΔGV=−1, then the second pre-flash becomes 50 µs, as entered in row P13. It should be noted that P1 and P11 represent a case where there is no second pre-flash.

Next, actual flash table No. is determined (S165). Here, a range of cells in the table used for the time of actual flash, within the relative GV value table, is determined. For example, in the example shown in FIG. 7, cells designated by columns that have been selected in step S163 from within P1-P4 . . . , P11-P14 . . . in the line direction, and the line D of actual flash amount difference ΔGV are determined as a range of cells used for the time of actual flash. With the first pre-flash at MIN, if a difference ΔGV between the first and second pre-flash GV values is made 2, a range Q designated by P4 row and D columns constitutes a table used at the time of actual flash. If actual flash table No. has been determined in step S165, the originating flow is returned to.

Next, operation for determination of actual flash amount in step S145 will be described using the flowchart shown in FIG. 6.

If the flow for determination of actual flash amount is entered, actual flash amount difference ΔGV is calculated (S171). Actual flash amount is obtained as light emission time by having ΔGV correspond with relative GV value in a relative value GV table of FIG. 7. With the example of FIG. 7, a reference emitted light amount of the actual flash in row C is made emitted light amount of pre-flash 1. Also, with the example of FIG. 7, an actual flash reference emitted light amount difference in line Ca is made ΔGV0. ΔGV0 means ΔGV=0, and represents that emitted light amount for actual flash amount is equivalent to emitted light amount of pre-flash 1. Accordingly, a row corresponding to zero in a table for actual flash amount difference ΔGV shown in D of FIG. 7 represents light emission time corresponding to emitted light amount for pre-flash 1, which is emitted light amount for reference of actual flash amount.

Here, actual flash amount difference ΔGV is calculated based on the following equation.

$$\Delta GV = GV\_3 - GV\_1 + \Delta GVN$$

Here, ΔGV is actual flash amount difference ΔGV of FIG. 7, GV_3 is actual flash amount represented by absolute GV value that has been transmitted from the camera in step S145, GV_1 is GV value for pre-flash 1 (absolute value of emitted light amount for pre flash 1 that has been transmitted from the camera), and ΔGVN is a reference emitted light amount difference, and with the example of FIG. 7 a result of ΔGV0 (ΔGV=0) is obtained.

With the relative GV value table shown in FIG. 7, within a table No. that was selected in step S165, a light emission time designated using actual flash amount difference ΔGV calculated with the above equation based on absolute GV value for actual flash amount that was transmitted in step S145 may be selected. For example, in a case where the range Q in FIG. 7 has been selected, if actual flash amount difference ΔGV that is based on absolute GV value of actual flash amount that has been transmitted from the camera is 0, a light emission time of 45 μs is selected, if ΔGV is +3 a light emission time of 75 μs is selected, and if ΔGV is +3 a light emission time of 55 μs is selected. It should be noted that in FIG. 7 an emitted light amount constituting a reference for emitted light amount of actual flash is made emitted light amount for pre-flash 1, but may also be made emitted light amount for pre-flash 2. Also, with FIG. 7 actual flash reference emitted light amount difference ΔGVN is made ΔGV0 (ΔGV=0), but may also be set to ΔGV2 (ΔGV=2), ΔGV-1 (ΔGV=−1) etc.

If, in step S173, a light emission time corresponding to actual flash amount difference ΔGV has been selected and light emission time for actual flash determined, the originating flow is returned to. Once the originating flow is return to, then as was described previously, actual flash is carried out in step S147.

As has been described above, with one embodiment of the present invention, a flash unit has a storage section that stores information relating to light emission time for actual flash that corresponds to a difference between emitted light amount command value for actual flash or the flash firing section and emitted light amount command value for pre-flash (refer, for example, to the storage section 107, and to the relative GV value table shown in FIG. 7). There are also a communication step of communicating with a flash control unit (refer, for example, to S1, S101, S13 and S113 in FIG. 2, and to S33, S133, S43 and S143 in FIG. 3), a light emission time calculating step of obtaining light emission time corresponding to emitted light amount command value for actual flash based on a difference between emitted light amount command value for pre-flash that is input in the communication step and emitted light amount command value for actual flash that has been input in the communication step, and information stored in the storage section (refer, for example, to S145 in FIG. 3 and to FIG. 6), and an actual flash control step of controlling actual flash of the flash firing section based on light emission time for actual flash that was calculated in the light emission time calculating step (refer, for example, to S147 in FIG. 3).

In this way, in the one embodiment of the present invention, a relative GV value table is stored in accordance with difference between first and second pre-flash amount and difference from an actual flash amount, a difference in absolute GV value that has been transmitted from the campsite is obtained, and by table reference, using relative GV value, emitted light amount for pre-flash and for actual flash are controlled. This means that it is possible to carry out control of emitted light amount for the flash unit even if charged voltage of a main capacitor is not detected.

It should be noted that in the one embodiment of the present invention, pre-flash is carried out once or twice, but this is not limiting and pre-flash may be carried out three or more times. In this case the relative GV value table is stored in accordance with a plurality of occurrences of pre-flash.

Also, in the one embodiment of the present invention, the imaging control section 205, image processing section 207, storage section 209, AE control section 211, power supply control section 213, memory 215, operation section 217, display section 219 and flash control section 221 have been constructed separately from the control section 230, but some or all of these components may be configured as software, and executed by the CPU within the control section 230. Similarly, some or all of the power supply control section 103, operation section 105, storage section 107 etc. may be configured as software, and executed by the CPU within the control section 120. It is also possible for these sections to have a hardware structure such as gate circuits generated based on a programming language that is described using Verilog, and also to use a hardware structure that utilizes software such as a DSP (digital signal processor). Suitable combinations of these approaches may also be used.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. Further, as a camera it is possible to apply to various instruments such as for medical equipment, for scientific instruments such as microscopes, surveillance cameras etc. The present invention can be applied to any of the implementations, providing it is a device for taking pictures that is used in combination with an external flash unit.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A flash unit capable of being attached to a flash control unit, comprising:
   a flash light emitting source;
   a communication circuit that carries out communication with the flash control unit;
   a memory that stores information relating to a light emission time for actual flash corresponding to a difference between an emitted light amount command value for actual flash of the flash light emitting source and an emitted light amount command value for pre-flash; and
   a controller, including a light emission time calculation section, that obtains light emission time corresponding to emitted light amount command value for actual flash based on (1) an emitted light amount command value for pre-flash that has been received from the flash control unit via the communication circuit, (2) an emitted light amount command value for actual flash that has been received from the flash control unit via the communication circuit, and (3) information stored in the memory, wherein
   the controller inputs the emitted light amount command value for pre-flash that has been received from the flash control unit via the communication circuit to the light emission time calculation section, inputs the emitted light amount command value for actual flash that has been received from the flash control unit via the communication circuit to the light emission time calculation section, and controls actual flash of the flash light emitting source based on the light emission time obtained by the light emission time calculation section.

2. The flash unit of claim 1, wherein
   the controller is capable of carrying out a first pre-flash and a second pre-flash for the flash control unit, before actual flash of the flash light emitting source,
   the memory further stores information relating to light emission time for actual flash corresponding to a difference between the emitted light amount command value for first pre-flash and the emitted light amount command value for second pre-flash, and
   the light emission time calculation section obtains light emission time corresponding to emitted light amount command value for actual flash based on emitted light amount command value for first pre-flash that has been input, emitted light amount command value for second pre-flash that has been input, and information stored in the memory.

3. The flash unit of claim 2, wherein
   the memory contains a plurality of items of information relating to light emission time corresponding to the emitted light amount command value for actual flash, in accordance with a difference between the emitted light amount command value for first pre-flash and the emitted light amount command value for second pre-flash.

4. The flash unit of claim 1, wherein
   the memory contains information relating to light emission time corresponding to the emitted light amount command value for actual flash, in accordance with a difference between the emitted light amount command value for pre-flash and the emitted light amount command value for actual flash, and the emitted light amount command value for pre-flash, and
   the light emission time calculation section obtains information relating to light emission time corresponding to the emitted light amount command value for actual flash, in accordance with a difference between the emitted light amount command value for pre-flash and the emitted light amount command value for actual flash, and the emitted light amount command value for pre-flash.

5. The flash unit of claim 4, wherein
   the memory contains information relating to light emission time corresponding to a plurality of the emitted light amount command values for actual flash in accordance with the emitted light amount command value for pre-flash.

6. An emitted light amount control method, for a flash unit that is capable of being attached to a flash control unit, and has a flash light emitting source and a memory that stores information relating to light emission time for actual flash corresponding to a difference between emitted light amount command value for actual flash and emitted light amount command value for pre-flash of the flash light emitting source, comprising:
   carrying out communication with the flash control unit;
   calculating a light emission time corresponding to emitted light amount command value for actual flash based on a difference between an emitted light amount command value for pre-flash that has been communicated from the flash control unit and an emitted light amount command value for actual flash that has been communicated from the flash control unit, and information stored in the memory; and
   controlling actual flash of the flash light emitting source based on the light emission time for actual flash that has been calculated.

7. The emitted light amount control method of claim 6, wherein:
   a first pre-flash and a second pre-flash for the flash control unit are carried out before actual flash of the flash light emitting source,
   wherein the memory further stores information relating to light emission time for actual flash corresponding to a difference between the emitted light amount command value for first pre-flash and the emitted light amount command value for second pre-flash, and light emission time corresponding to emitted light amount command value for actual flash is obtained based on emitted light amount command value for first pre-flash that has been input, emitted light amount command value for second pre-flash that has been input, and information stored in the memory.

8. The emitted light amount control method of claim 7, wherein:
the memory contains a plurality of items of information relating to light emission time corresponding to the emitted light amount command value for actual flash, in accordance with a difference between the emitted light amount command value for first pre-flash and the emitted light amount command value for second pre-flash.

9. A non-transitory computer-readable medium storing a processor executable code, which when executed by at least one processor, this processor being built into a flash unit that is capable of being attached to a flash control unit, the flash unit having a memory that stores information relating to a light emission time for actual flash corresponding to a difference between an emitted light amount command value for actual flash and an emitted light amount command value for pre-flash of the flash light emitting source, carries out control of emitted light amount for the flash unit, the emitted light amount control method comprising:
carrying out communication with the flash control unit;
calculating a light emission time corresponding to emitted light amount command value for actual flash based on a difference between an emitted light amount command value for pre-flash that has been communicated from the flash control unit and an emitted light amount command value for actual flash that has been communicated from the flash control unit, and information stored in the memory; and
controlling actual flash of the flash light emitting source based on the light emission time for actual flash that has been calculated.

10. The non-transitory computer-readable medium of claim 9, the emitted light amount control method comprising:
carrying out a first pre-flash and a second pre-flash for the flash control unit before actual flash of the flash light emitting source,
wherein the memory further stores information relating to light emission time for actual flash corresponding to a difference between the emitted light amount command value for first pre-flash and the emitted light amount command value for second pre-flash, and
obtaining light emission time corresponding to emitted light amount command value for actual flash based on emitted light amount command value for first pre-flash that has been input, emitted light amount command value for second pre-flash that has been input, and information stored in the memory.

11. The non-transitory computer-readable medium of claim 9, wherein:
the memory contains a plurality of items of information relating to light emission time corresponding to the emitted light amount command value for actual flash, in accordance with a difference between the emitted light amount command value for first pre-flash and the emitted light amount command value for second pre-flash.

* * * * *